US012210002B2

(12) United States Patent
Drustrup et al.

(10) Patent No.: US 12,210,002 B2
(45) Date of Patent: Jan. 28, 2025

(54) FIRE TESTING DEVICE AND METHOD

(71) Applicant: Dansk Brand- og sikringsteknisk Institut, Hvidovre (DK)

(72) Inventors: Anders Drustrup, Hvidovre (DK); David Ring, Kirke Hyllinge (DK); Jeanne Bjerre Kirk, Virum (DK); Dan Hvolgaard Lauridsen, Lyngby (DK)

(73) Assignee: Dansk Brand—og sikringsteknisk Institut, Hvidovre (DK)

( * ) Notice: Subject to any disclaimer, the term of this patent is extended or adjusted under 35 U.S.C. 154(b) by 773 days.

(21) Appl. No.: 17/264,369

(22) PCT Filed: Aug. 2, 2019

(86) PCT No.: PCT/EP2019/070897
§ 371 (c)(1),
(2) Date: Jan. 29, 2021

(87) PCT Pub. No.: WO2020/025796
PCT Pub. Date: Feb. 6, 2020

(65) Prior Publication Data
US 2021/0302294 A1    Sep. 30, 2021

(30) Foreign Application Priority Data

Aug. 2, 2018    (DK) .......................... PA 2018 705 15

(51) Int. Cl.
*G01N 3/60*    (2006.01)
*F27B 17/00*    (2006.01)
*F27D 19/00*    (2006.01)
(52) U.S. Cl.
CPC ............... *G01N 3/60* (2013.01); *F27D 19/00* (2013.01); *F27B 2017/0091* (2013.01);
(Continued)

(58) Field of Classification Search
CPC ............. G01N 3/60; G01N 2203/0057; G01N 2203/006; F27D 19/00; F27D 2019/0012; F27B 2017/0091
See application file for complete search history.

(56) References Cited

U.S. PATENT DOCUMENTS 6,271,024 B1 *   8/2001   Sve .......................... G01N 3/60
                                                    422/417
6,536,943 B1 *   3/2003   Feske ..................... G01N 25/50
                                                    252/607
(Continued)

FOREIGN PATENT DOCUMENTS

CN          2070443 U     1/1991
CN          02052936 A    5/2011
(Continued)

OTHER PUBLICATIONS

Translation of DE4336405A1 to Hehl (Year: 1995).*
(Continued)

*Primary Examiner* — Mirellys Jagan
(74) *Attorney, Agent, or Firm* — Holland & Hart LLP

(57) ABSTRACT

A fire testing device for testing fire-resistance properties of a test subject includes a cavity, a heat source adapted to heat the cavity, and a removable separation plate configured to subdivide the cavity into a first chamber and a second chamber. The heat source is arranged in the first changer and adapted to preheat the first chamber. The second chamber includes an opening adapted to receive the test subject. A fire-resistance test of the test subject may include activating the removable separation plate to subdivide the cavity into the first chamber and the second chamber, arranging the test subject at an opening of the second chamber, preheating the first chamber to a defined temperature using the heat source, deactivating the removable separation plate to provide an
(Continued)

undivided cavity, and sustaining a heat supply to the cavity using the heat source.

14 Claims, 6 Drawing Sheets

(52) U.S. Cl.
CPC ............... *F27D 2019/0012* (2013.01); *G01N 2203/0057* (2013.01); *G01N 2203/006* (2013.01)

(56) References Cited

U.S. PATENT DOCUMENTS

| | | | |
|---|---|---|---|
| 2010/0080261 | A1 | 4/2010 | Lee et al. |
| 2011/0110393 | A1 | 5/2011 | Kim et al. |
| 2012/0118038 | A1* | 5/2012 | Brocker ............... G01P 21/00 73/1.37 |
| 2013/0243028 | A1* | 9/2013 | Singh ............... G01N 25/00 374/43 |

FOREIGN PATENT DOCUMENTS

| | | | |
|---|---|---|---|
| CN | 105333734 | A | 2/2016 |
| CN | 114295912 | A * | 4/2022 |
| DE | 43 36 405 | A1 | 5/1995 |
| JP | H 03195946 | A | 8/1991 |
| KR | 20160038601 | A | 4/2016 |

OTHER PUBLICATIONS

Hugi E. et al.; "Measured and Calculated Temperature Evolution on the Room Side of a Butted Steel Door Frame Subjected to the Standard Fire of ISO 834,"; Fire Safety Journal, Elsevier, Amsterdam, NL, vol. 44, No. 5, Jul. 1, 2009 (Jul. 1, 2009), pp. 808-812, XP026122217, ISSN: 0379-7112, DOI: 10.1016/J.FIRESAF.2009.02.003.

Mohamed A Sultan, "Fire Resistance Furnace Temperature Measurements: Plate Thermometers vs Shielded Thermocouples," Fire Technology, Kluwer Academic Publishers, BO, vol. 42, No. 3, May 15, 2006 (May 15, 2006), pp. 253-267, XP019395706, ISSN: 1572-8099, DOI: 10.1007/S10694-006-8431-7; figures 5, 6.

Search Report by the Danish Patent and Trademark Office of the Danish, Priority Application No. PA 2018 70515, Helgeshøj Allé 81, 2630 Taastrup, DK, 4 pages.

* cited by examiner

FIRE TESTING DEVICE AND METHOD

CROSS-REFERENCE

The present application is the U.S. national stage entry under 35 U.S.C. § 371 of PCT Application No. PCT/EP2019/070897 by Drustrup et al., entitled "A FIRE TESTING DEVICE AND METHOD," filed Aug. 2, 2019, and claims the benefit of Denmark Patent Application No. PA 2018 70515 by Drustrup et al., entitled "A FIRE TESTING DEVICE," filed Aug. 2, 2018. Each of these applications is incorporated herein by reference.

FIELD OF THE DISCLOSURE

The present disclosure relates to a fire testing device for testing fire-resistance properties of a test subject and a method for the use in testing fire-resistance properties of a test subject.

BACKGROUND

In older as well as new buildings, fire hazards and spreading of fire is typically considered during construction and remodelling. When a fire spreads through a construction, time is essential, as minutes may determine the life or death of people inside a building. Hence, the choice of materials and construction elements with sufficient fire resistance properties is important.

Legislation on the area is typically based on previous cases of fire in buildings, such that the properties of the building materials and construction elements are investigated and specific materials may be forbidden in new buildings, due to their insufficient fire resistance properties.

Evaluating and assessing the fire resistance properties of a material, however, requires testing of the material under certain standardised conditions, such as a temperature curve according to the ISO 834-standard. Fire resistance properties of a test subject may be evaluated as the time, during which a surface of material is subjected to a predetermined, standardised temperature curve, until an opposite side of the material reaches a predetermined surface temperature.

This type of testing is typically carried out at special facilities, where gas-driven test ovens having several burners provide the necessary heat for the temperature in the oven chamber to follow a fire test temperature curve, e.g. according to the ISO 834-standard. Commonly, the heat source capabilities are chosen, such that the very high temperature gradient (dT/dt) within the first five to ten minutes of the fire resistance test can be achieved in the oven chamber. For this reason, gas burners rather than other heating means are relied upon. When increasing the gas flow to the burners in order to increase the temperature gradient, however, an excessive pressure will occur in the oven chamber, which is typically regulated by ventilation in combination with the gas burners. The adjustment of these various factors leads to an adjustment delay. Furthermore, if the gas flow to the burners is removed, a start-up process of the burner, typically lasting 5-10 minutes, is necessary for the burner to provide a continuous combustion subsequently. Turning off the gas burners therefore introduces an even longer adjustment delay. Thus, the operation of a gas test oven requires a skilled operator. However, due to the adjustment delay as well as safety procedures to be followed when operating these gas ovens, lack of reproducibility of fire resistance tests remains a problem. Therefore, similar materials may yield different results, and several tests need to be performed to provide a statistical evidence.

Furthermore, during the first 5-10 minutes, the risk of falling outside the tolerances of the desired temperature curves may be significant due to the adjustment delay and high temperature gradient during this period. If the temperature falls outside the tolerances of the desired temperature curve, a new test will usually have to be conducted. The test subject, such as a building material or a constructional element, however, cannot be reused for a second test, if this has once been heated. As it may imply high costs to provide a new test subject setup, it remains a problem to reduce the risk of the temperature falling outside the tolerances of the desired temperature curve.

Moreover, the oven chamber, which is often rather well insulated to be able to reach temperatures above 1000° C. during the fire resistance tests, typically re-mains hot for several hours after a test has been conducted. As most fire resistance tests, such as per the ISO 834-standard, must commence at around room temperature, only few fire resistance tests, which may last less than 30 minutes, can be per-formed in each oven every day due to the cool-down time, thereby yielding high costs per test.

SUMMARY

It is therefore an objective of the present disclosure to provide an apparatus and a method for testing fire resistance properties of materials and/or constructional elements in a reproducible manner and reducing the costs per test.

It has now been found that this problem can be solved by providing a fire testing device for testing fire-resistance properties of a test subject, said fire testing device comprising a cavity and a heat source adapted to heat said cavity, wherein said fire testing device comprises means for subdividing said cavity into a first chamber and a second chamber, wherein said heat source is arranged in said first chamber and is adapted to preheat said first chamber, wherein said second chamber comprises an opening adapted to receive the test subject, and wherein said means for subdividing is a removable separation plate.

Here, fire-resistance capability testing includes performing an assessment of the performance of a test subject when at least a part of the test subject is subjected to temperatures, at least partially emulating fire conditions. This performance assessment may be based on a single parameter, such as surface temperature or the like, or several parameters and may be made with respect to a reference test subject. Thus, fire-resistance capability testing is here not necessarily to be considered as an accredited fire-resistance performance test, e.g. according to an international standard, but may also be an assessment of other fire-resistance capabilities of a test subject, when subjected to fire-emulating conditions. Accordingly, fire-resistance test here refers to testing fire-resistance capabilities of a test subject.

A test subject may here comprise a single material, an assembly of various materials, and/or a construction comprising one or more different materials.

Here, the means for subdividing the cavity into the first chamber and the second chamber can be activated, such that the cavity is divided into the first and second chamber. The means may be activated by insertion, assembly, sliding, unfolding, closing, or the like, of the means. Similarly, the means may be deactivated by removal, disassembly, sliding, folding, opening, or the like, of the means, thereby resulting in an undivided cavity.

By the fire testing device comprising means for subdividing the cavity into a first chamber and a second chamber, the temperature in the first and second chamber may be different. It is thereby possible to e.g. heat the first chamber, whilst maintaining room temperature in the second chamber. Hence, a heat buffer may be built up within the first chamber. Subsequently, the means may be deactivated, when the temperature inside the first chamber has reached a predetermined temperature, such that one undivided cavity is provided. The heat will then spread rapidly as the volume of the preheated chamber mixes with the room-tempered chamber within the now undivided cavity. Thereby, a high temperature gradient, such as the one required to follow the ISO 834-temperature curve, can be achieved. This allows for controlling the temperature of the cavity in a reproducible manner, regardless of the heat source.

By the heat source being arranged in the first chamber, the first chamber may be a preheating chamber. Since the first chamber constitutes a part of the cavity, the heat source may be able to preheat the first chamber to a predetermined temperature, faster than the entire cavity, thereby allowing for a higher temperature gradient. The division of the cavity into the chambers may furthermore reduce the necessary time between tests. By the second chamber comprising an opening adapted to receive the test subject, the test subject may be arranged at a fixed position with respect to the fire testing device. This, in turn, may allow for more uniform tests. Moreover, temperature sensors, such as temperature probes, thermocouples, thermal cameras, or a combination thereof, may be provided in the second chamber, to provide a measurement of the temperature, to which the test subject is exposed.

For instance, the temperature inside a part of the cavity may be controlled to follow the ISO 834-curve in a fire resistance test. The large temperature gradient, i.e. the time-derivative of the temperature inside the cavity, dT/dt, within the first approximately five to ten minutes of a fire-resistance test may thus be achieved in a repeatable manner by preheating the first chamber to a predetermined temperature and subsequently deactivating the means for subdividing. The cavity may be thermally insulated to be able to reach temperatures around or above 1000° C. whilst minimising the heat provided to the surroundings. In some examples, the cavity may be able to reach at least 600° C. By preheating the chamber, the test results are furthermore less sensitive to minor outages or the like of the heat source.

Additionally, the means for subdividing may be activated and one of the chambers, i.e. the second chamber, may be cooled, while the other chamber remains heated actively or by residual heat. When the second chamber reaches a threshold temperature, e.g. room temperature, the process may be repeated and the ISO 834-curve may again be achieved. Hence, the time from one fire-resistance test is initiated until the next may be initiated can be shortened compared to a one-chamber test oven, thereby reducing the costs of a fire resistance test. One or more of the chambers and/or the cavity may comprise, may be substantially filled, or may be filled with a gas and/or a gas composition. The gas composition may in some examples at least initially be atmospheric air.

The separation plate may be activated/deactivated within a few seconds or more. Consequently, the temperature gradient may be regulated by adjusting the deactivation time, i.e. the time during which the chambers are partly separated by the separation plate, as this regulates the volume flowing between the chambers.

In some examples, the removable separation plate is adapted to be inserted into and/or removed from the cavity.

This may allow for an easy activation and/or deactivation of the means for subdividing, i.e. the separation plate. Moreover, different separation plates having different properties, such as thermal conduction or insulation properties, may be used with the same fire testing device. The separation plate may be inserted in grooves within one or more side walls of the fire testing device. Alternatively, a rail system may be provided, on which the separation plate may slide, and/or the separation system may be hinged, such that it when deactivated remains attached to the fire testing device. Furthermore, the separation plate may be constituted by a plurality of plate elements, which can be removed, slid, flipped, turned, folded, or extracted individually. The separation plate is preferably made from a heat insulating material and is preferably sufficiently light for one person to extract it by hand. The separation plate may be covered by a layer of thermally conducting material, such as a layer of a metal. The insertion and removal may, for instance, be carried out through an opening in a side of the fire testing device or through a top opening thereof.

In another embodiment of the fire testing device, the heat source is an electrical heat source.

In contrast to the established paradigm in the industry that electrical heat sources are not suitable for fire resistance testing, the inventors have found electrical heat sources, such as heating rods, to be highly suitable for fire resistance testing in the construction according to the principles of the present disclosure.

By the heat source being electrical, the heating may be controlled by controlling the current delivered to the electrical heat source. Thereby, the chamber may be heated without emission of exhaust gasses, which requires filtering and/or environmental consideration, and without requiring safe handling of e.g. gas like butane. Hence, the environmental impact as well as the need for ventilation of the surroundings is reduced by using an electrical heat source instead of combustion heating. Furthermore, the adjustment delay is minimised, as the electrical current to the heat source can be changed nearly instantly. Similarly, the heat source may be switched on or off nearly instantly, also providing quicker adjustment of the system and, thereby reducing the risk of falling outside the tolerances of a predetermined temperature curve. A temperature may be measured by e.g. thermocouples or thermographic camera or the like within the cavity, such as in the first and/or the second chamber, and/or at or around the test subject.

Furthermore, by the electrical heat source being arranged in the first chamber, the electrical heat source may preheat the first chamber. By using the electrical heat source to preheat the first chamber instead of heating the entire cavity from room temperature with the temperature gradient dT/dt, the required power from the electrical heat source may be reduced. Hence, a smaller and/or cheaper electrical heat source as well as power supply to this may be used, thereby making the fire testing device cheaper in production. Moreover, the electrical heat source may be chosen, such that it may be supplied by a standardised industrial power outlet, such as a 3-phase 32A power outlet. Thereby, the fire testing device may be used in various environments, where customised high-power installations are not present. Additionally, no gas installations, which require piping and safety precautions and procedures, are required, thereby allowing the fire testing device to be used in various locations.

In yet another embodiment of the fire testing device, the opening of the second chamber is adapted to receive a lid comprising said test subject.

Consequently, the test subject may be subjected to heat corresponding to the temperature inside the second chamber. It is thereby possible to adjust the heat provided to the test subject. The lid may be a test subject, such as a constructional element, may be made from a test material, or may comprise a sample of a test material and/or constructional element. The lid preferably covers the opening of the second chamber. Furthermore, the lid may be provided with temperature sensors or a thermographic camera on a first surface, facing the second chamber, or on an opposite, second surface.

The lid may form a third chamber in the shape of a volume, and the test subject may be arranged in between the second chamber and the third chamber. An atmosphere (such as the composition of gasses, the temperature, and/or the humidity) may be controlled in the third chamber. Thereby a similar environment may be created for various test subjects of different tests, thus minimising effects from the surroundings.

In another embodiment of the fire testing device, the fire testing device further comprises means for regulating a gas pressure inside said cavity.

Consequently, the gas pressure may be controlled e.g. to ensure a constant pressure inside the fire testing device in operation. The pressure inside the fire testing device may be controlled to be similar to the gas pressure of the surroundings. Alternatively, a lower pressure or an overpressure may be provided inside the cavity by the means for regulating the gas pressure. By regulating the gas pressure inside the oven, porous materials and/or constructions may be tested, e.g. by applying a predetermined positive or negative pressure, such as a positive pressure of approximately 20 Pa inside the cavity. Furthermore, as pressure may change the material properties of a material, fire-resistance properties dependent on pressure may be investigated in a repeatable manner.

In an example, the pressure regulating means comprise a valve arrangement for admitting a pressurised gas into said cavity.

The pressure may be regulated by pressurised air or by another pressurised gas mixture, through the valve arrangement. The valve arrangement may comprise an adjustable valve and a chimney, e.g. to provide natural ventilation. Multiple valves in multiple locations within the cavity may also be used to provide a more even distribution of air or gas mixture within the chamber and hence minimise the turbulence. Alternatively, a fan may be used, instead of or in combination with pressurised air or gas mixture. The means for regulating the gas pressure may allow for controlling the pressure in the first and second chamber individually or in the cavity, when the subdividing means are deactivated.

In another embodiment of the fire testing device, the fire testing device further comprises means for regulating a gas constituent concentration inside the cavity.

By regulating the gas constituent concentration inside the cavity, a level of various gas constituents, together constituting a gas or gas composition inside the cavity, which allows for a combustion with desired properties of the test material, may be provided. Moreover, similar test conditions, not only in terms of temperature, may be provided, allowing for more repeatable tests of fire-resistance properties.

The means for regulating the gas constituent concentration may comprise a pressurised gas, such as air or a gas composition, ventilation, e.g. by a fan, natural ventilation, or any combination thereof. The gas intake into the chamber may be regulated by valves through an aperture in the cavity. Furthermore, the gas constituent concentration may be regulated in either the first or the second chamber, in both chambers, and/or in the cavity when the means for subdividing have been deactivated.

In some examples, the gas constituent concentration may be one or more from the group of: oxygen ($O_2$), nitrogen ($N_2$), carbon dioxide ($CO_2$), or water vapour ($H_2O$) concentration. An oxygen level of at least 4-8% by volume may be preferred, as to create a similar environment as in gas-driven test oven for fire resistance tests so as to provide an easier comparison between tests of a test subject in a gas-driven test oven and in the fire testing device according to the principles of the present disclosure. The means for controlling the gas constituent concentration and the gas pressure may be the same means.

In yet another example of the fire testing device, the fire testing device further comprises control means for controlling a power supply to said electrical heat source.

Consequently, the heating provided by the electrical heat source may be controlled e.g. to follow the ISO 834-temperature curve, thereby, again, increasing the repeatability of the tests. The control means may for instance control the voltage and/or current supplied to the electrical heat source allowing for a direct current (DC), pulsed DC, or alternating current (AC). The control means may comprise a user interface, through which an operator can control the power supply. Additionally, the control means may be automated to control the heat provided by the electrical heat source, such that the temperature of a chamber or the cavity follows a predetermined temperature curve. The control means may be integral with the fire testing or may be external. The control means may furthermore control the means for subdividing, means for regulating the pressure in the cavity, and/or means for regulating the gas constituent concentration in the cavity.

According to another aspect, the disclosure relates to a method for the use in testing fire-resistance properties of a test subject comprising the steps of:
providing a fire testing device according to the first aspect of the present disclosure,
subdividing said cavity into a first chamber and a second chamber by activating said removable separation plate,
arranging the test subject at the opening of the second chamber,
pre-heating said first chamber to a predetermined temperature using said heat source,
deactivating said removable separation plate, thereby providing an undivided cavity,
sustaining heat supply to said cavity using said heat source.

Here, the step of arranging the test subject may also be performed before the step of subdividing the cavity or after the step of pre-heating the first chamber instead. Furthermore, the skilled person will appreciate that the term "sustaining" heat supply may also include residual heat from the heat source, such as heating rods, and does not necessarily require continuous addition of additional energy to the heat source. Rather, an intermittent AC or DC supply could be used.

Consequently, an operator is able to provide a predetermined temperature curve over time to a test subject. By pre-heating the first chamber, high temperature gradients may be achieved by deactivating the means for subdividing, when a threshold temperature in the first chamber has been reached. Thereby the preheated air, gas, or gas composition, mixes with the colder air, gas, or gas composition from the second chamber in a similar manner every time, thus providing an increased reproducibility. Furthermore, the heating capability of the heat source may be reduced compared to when heating the entire cavity with the high temperature gradient. This may allow for the use of less costly heat sources and/or longer life time due to less stress on the heat sources, thus reducing the costs per tests.

As described with respect to the first aspect of the disclosure, the activation of the means for subdividing may be performed through insertion, assembly, sliding, unfolding, closing, or the like, of the means. Similarly, the means may be deactivated by removal, disassembly, sliding, folding, opening, or the like, of the means. The method according to the second aspect of the present disclosure may provide the same advantages to the fire-testing device according to the first aspect of the present disclosure.

In another example of the method, the heat supply to said cavity is sustained for a predetermined duration.

Consequently, a test of fire resistance properties following e.g. the ISO 834-temperature curve may be performed over a given period of time. This may for instance be verification tests of materials and/or material assemblies, 30-, 60-, or 90-minute compliance tests, or tests of material strength, running until one or more desired properties of the test subject exceeds a predetermined threshold value.

In an example of the method, the step of subdividing the cavity comprises inserting the removable separation plate into the cavity, and/or the step of deactivating the removable separation plate comprises removing the separation plate from the cavity.

This may, as described with respect to the fire testing device according to the first aspect of the disclosure, provide an easy operation of the separation plate. Moreover, various removable separation plates with different heat conducting and/or insulating properties may be used with the same fire testing device.

In yet another example of the method, the method further comprises the step of: regulating a gas pressure inside the cavity.

Thereby, the fire-resistance properties of the test subject may be subjected to controlled conditions, in turn allowing for a more repeatable and uniform test. Moreover, a potential dependency of one or more fire-resistance properties on gas pressure or change with gas pressure may be investigated. The gas pressure may be regulated to simulate those of a fire so as to simulate a temperature and/or a gas pressure during a fire.

In an example, the method further comprises the step of: regulating a gas constituent concentration inside the cavity:

Thereby, the composition of the gas inside the cavity may be altered before and/or during a test. This, in turn, allows for a more repeatable test, as the gas composition may be controlled to be the same in multiple tests. Moreover, the gas composition may be controlled to influence the combustion of the test subject.

In some examples, the gas constituent and the levels thereof may be one or more of the gasses described above with respect to the fire testing device according to the first aspect of the present disclosure. Similarly, the regulation of the gas constituent concentration inside the cavity may be performed by means therefor described with respect to the fire testing device according to the first aspect of the present disclosure.

In yet another example of the method, the sustained heat supply is controlled, such that the temperature inside the cavity follows a predetermined temperature curve, such as a temperature curve in accordance with ISO 834.

In some examples of the method, the temperature curve may be the Hydrocarbon fire curve.

By the sustained heat supply following a predetermined temperature curve, the material/assembly tests may be conducted in a repeatable manner. This allows for randomly checking a material and/or assembly during production, or directly comparing a plurality of materials/assemblies as well as compliance testing. Additionally, the control may be automated, thereby increasing the reproducibility and reducing the costs, as an operator may not be needed to control it during the entire test.

The different aspects of the present disclosure can be implemented in different ways including as a fire testing device and a method for testing fire-resistance properties of a test subject as described above and in the following, each yielding one or more benefits and advantages described in connection with at least one of the aspects described above, and each having one or more preferred examples corresponding to the preferred examples described in connection with at least one of the aspects described above.

Furthermore, it will be appreciated that examples described in connection with one of the aspects described herein may equally be applied to the other aspects.

BRIEF DESCRIPTION OF THE DRAWINGS

The principles of the present disclosure will now be described in greater detail based on non-limiting exemplary examples and with reference to the drawings, of which.

Similar reference numerals are used for similar elements across the various example s and figures described herein.

DETAILED DESCRIPTION

Figure 1:
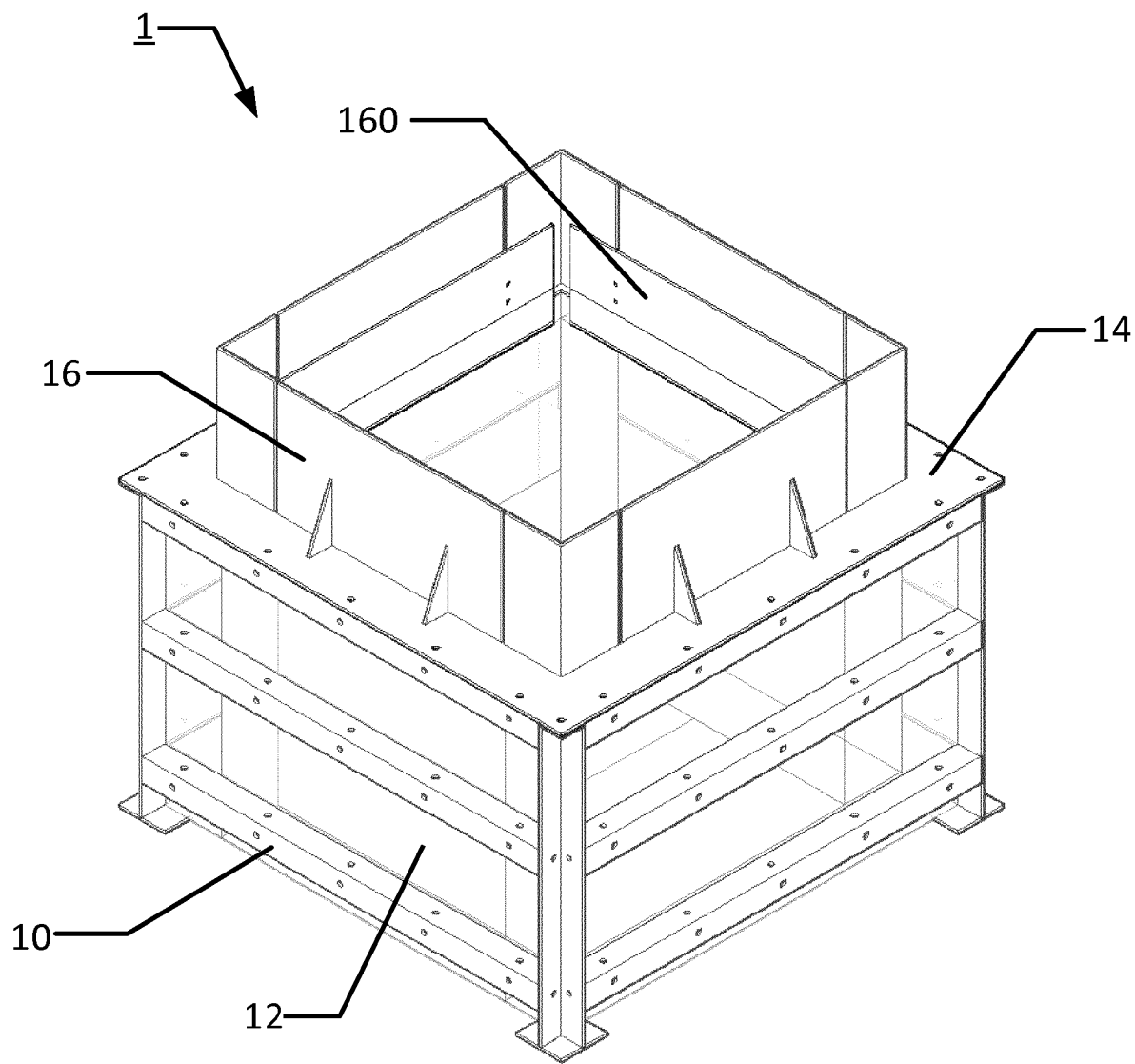
FIG. 1 shows an overall perspective view of an example of a fire testing device according to the principles of the present disclosure.

In FIG. 1, an overall perspective view of an example of a fire testing device 1 according to the disclosure is shown. The fire testing device 1 comprises an outer frame 10, an inner frame 12 and a top frame 14. The outer frame 10 provides stability for the fire testing device 1 and comprises legs to allow the fire testing device 1 to stand firmly. The outer frame 10 furthermore supports the inner frame 12, which delimits a cavity having a first and a second chamber, separated by separating means (not shown in FIG. 1), and an opening surrounded by the top frame 14 and a lid 16 comprising support bars 160. Preferably, the cavity opening by the top frame 14 is approximately 0.5 m×0.5 m.

The outer frame 10 may be made from metal, preferably steel, to provide the mechanical strength and stability for holding the fire testing device 1. The outer frame 10 may furthermore be arranged on wheels to allow the fire testing device 1 to be moved around easily. In another example, the outer frame 10 may allow for the fire testing device 1 to be rotated e.g. 90 degrees about a horizontal axis, such that the top frame 14 and the cavity opening extends in the vertical plane. For this, the outer frame 10 may comprise handles, straps, hooks or the like, such that the fire testing device 1 can preferably be rotated by two persons without the need for machinery. Alternatively, an interface, such as a strap, a hook, or the like, may be provided on the outer frame 10 to allow for a crane to lift and/or rotate the fire testing device 1. To facilitate this, the fire testing device 1 may be weight balanced to yield an approximately even gravitational force on a surface or the legs of the outer frame 10. In another example, an additional frame structure for holding the fire testing device 1 and allowing it to be rotated may be provided.

Figure 8:
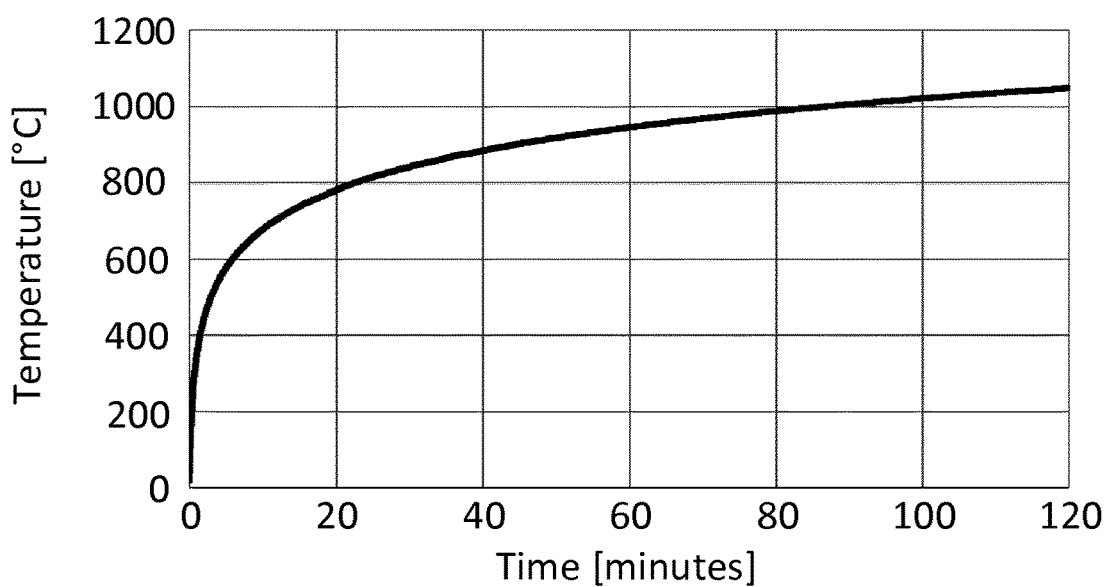
FIG. 8 shows a temperature curve for fire resistance testing according to the ISO 834-standard.

The inner frame 12, which delimits the cavity, may be made from a heat insulating material, such as a mineral-wool based material, ceramic wool, PROMA-FORM®-boards, or the like, to reduce the power necessary to heat the cavity in accordance with a predetermined temperature curve, such as the temperature curve according to the ISO 834-standard, as shown in FIG. 8. As the inner frame 12 should be able to repetitively withstand temperatures of e.g. 1200° C. inside the cavity as well as fast heating and cooling, a material suitable for this should be chosen for the inner frame 12. In order for the second chamber of the cavity to be able to cool down quickly after a fire resistance test, such that new test may be initiated, the inner frame 12 may furthermore be made from a material having a low thermal mass. The inner frame 12 may additionally comprise a metal plate on an outside thereof, i.e. the sides facing the outer frame 10. Thereby, the heat dissipation in case of small holes in the insulating inner frame 12 material may be minimised. Furthermore, the inner frame 12 may be composed from several inner frame parts connected to each other and/or to the outer frame 10 to form one inner frame 12. The connection between various frame parts of the inner frame 12 may be provided by adhesive, screws, pins, nuts and bolts, or any combination thereof.

The top frame 14 delimits the cavity opening and provides a surface, on which a test subject may be arranged and/or to which the lid 16 may be connected. The top frame 14 may be fastened on the inner frame 12 or the outer frame 10 and may, thus, protect the inner frame 12 from the mechanical loads of the lid 16 and/or the test subject by distributing the weight across the top frame 14. Thereby, sharp objects or heavy objects with a small footprint may be arranged at the cavity opening. The top frame 14 may be made from concrete, which allows for a long-lasting stable structure and an even surface for the test subject and/or the lid 16. As concrete has a large thermal mass, it may, however, remain heated for long time after a test and may lead to edge effects between the top frame 14 and the inner frame 12 and/or the lid 16 or the test subject. The top frame 14 may thus be made from a material similar to the one of the inner frame 12, or a combination of materials, such as concrete, PROMA-FORM®-boards, metal, such as steel, which have a sufficient mechanical strength and reduces the thermal edge effects.

The lid 16 is adapted to hold the test subject in position adjacent to the cavity opening e.g. by using brackets 160 to hold the test subject against the top frame 14. The lid 16 and brackets 160 may be made from metal, such as steel, or the like to provide sufficient mechanical strength to hold the test subject, and may hold this in place even in case of the test subject warping or deforming due to the high temperatures. The connection of the test subject against e.g. the top frame 14 provided by the lid 16 should be sufficiently air tight to allow for a positive or negative pressure difference across the test subject. For instance, a 20 Pa overpressure inside the second chamber may be maintained in accordance with the EN 1363-1 standard. In another example, the lid 16 may hold the test subject by other connecting means than brackets 160, such as clips, screws, bolts and nuts, or any combination thereof.

Upon the end of a test, the temperature of a surface of the test subject may be very high. Consequently, when the lid 16 is removed and the hot surface of the test subject contacts the oxygen from the surrounding air, flames may occur. To avoid this to cause damage and injuries to an operator of the fire testing device 1, the lid 16 may in another example be hinged on a side of the outer frame 10, the inner frame 12, and/or the top frame 14. Thereby, it is possible for the operator to open the lid 16 such that any potential flames will face away from the operator. Preferably, however, the lid 16 may be hinged and comprise a remote controlled, motor driven opening mechanism. Thereby, the operator can open the lid 16 from a distance and approach the test subject when the temperature of the test subject has decreased to a level without risk of flames.

Figure 2A:
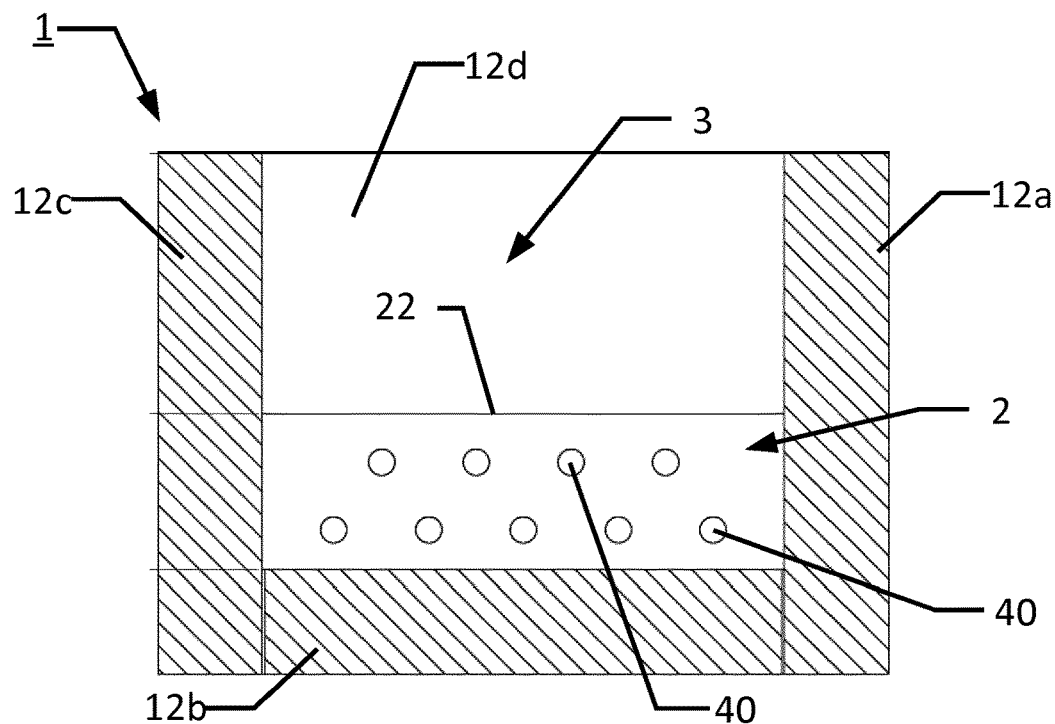
FIG. 2a shows a schematic cross-section of an example of a fire testing device according to the principles of the present disclosure.
Figure 2B:
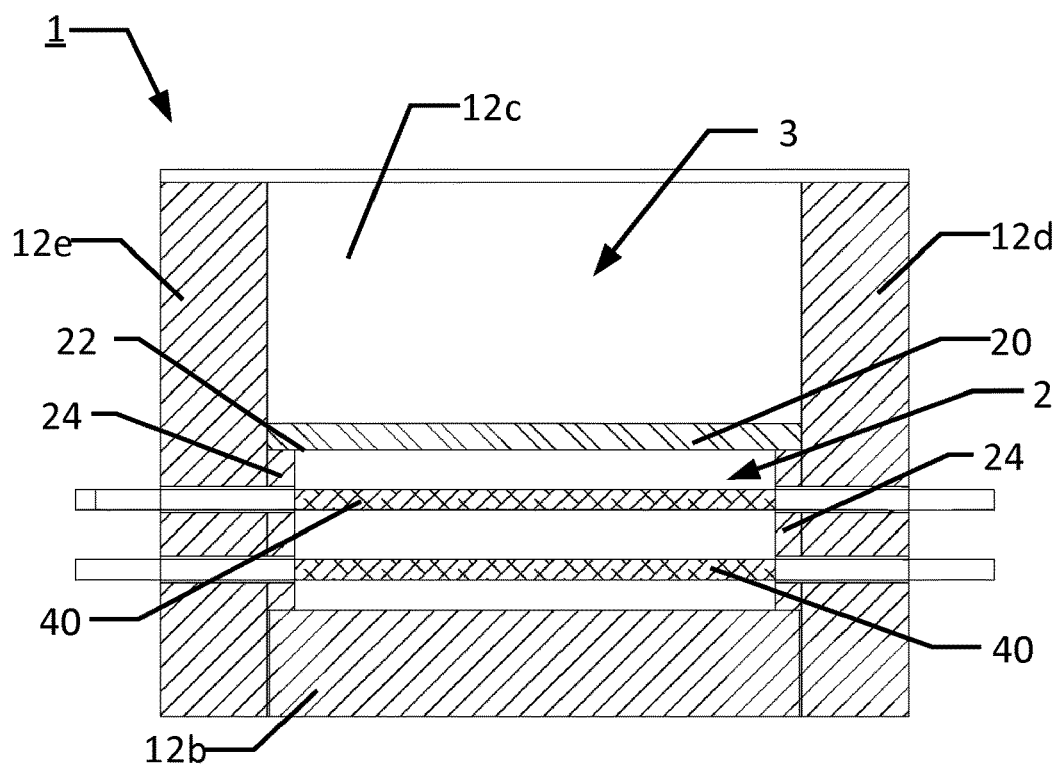
FIG. 2b shows a different schematic cross-section of the fire testing device shown in FIG. 2a, FIG. 3 shows a detailed cross-section of another example of a fire testing device according to the principles of the present disclosure.

In FIG. 2a, a schematic cross-section of an example of a fire testing device 1 according to the principles of the present disclosure is shown. In FIG. 2a, the inner frame comprises three inner frame parts 12a, 12b, 12c as well as 12d and 12e, as shown in FIG. 2b. The inner frame parts 12a-12e may be made from the same material with the same thickness, as seen in FIG. 2a, or may be made from different materials and/or have different dimensions. In particular, the inner frame part 12b may have a different thickness or be made from a different material than the frame parts 12a, 12c, 12d, 12e.

The fire testing device 1 additionally comprises the cavity comprising a first chamber 2 and a second chamber 3, which can be separated by separating means (not shown in FIG. 2a) and a grid 22, which protects a plurality of heating elements 40 arranged in the first chamber 2, against potentially down falling parts from the test subject, which, in use, is arranged adjacent to the opening of the second chamber 3. As the grid 22 will experience high temperatures and rapid heating and cooling, it may be made from steel or hardened steel or the like. Furthermore, the grid 22 should be sufficiently fine to only allow downfall pieces small enough not to cause damage to the plurality of heating elements 40. Similarly, the grid 22 should be easily removable, e.g. via the cavity opening, from the cavity to facilitate cleaning, i.e. removal of downfall.

The plurality of heating elements 40 are arranged in two rows and with nine heating elements, i.e. electrical heating rods, in total. The plurality of heating elements 40 may be fastened to the inner frame parts 12d and 12e, as shown in FIG. 2b. Alternatively or additionally, the plurality of heating elements 40 may be fastened to an internal arrangement in the first chamber 2 as also shown in FIG. 2b. In another example, different numbers, i.e. fewer or more, heating elements 40 and rows may be used. Whereas electrical heating rods are used as heating elements in this example, the skilled person will understand that other heating elements, such as gas burners or the like, may be used instead.

FIG. 2b furthermore shows the separation means, i.e. a separation plate 20, inserted to separate the first chamber 2 and the second chamber 3. The separation plate 20 is inserted from an opening in the inner frame part 12c, which in use may be heat insulated by inserting e.g. mineral wool. The separation plate 20 may be supported by the grid 22 and/or by the inner frame parts 12a, 12c, 12d, 12e, and/or by a construction in the first chamber 2, as shown in FIG. 2b. The separation plate 20 should moreover be made from a thermally insulating material, such as PROMA-FORM®-boards or ceramic wool, such that a preheating temperature of e.g. at least 1000° C. can be achieved in the first chamber 2, whilst the second chamber 3 remains at a temperature below 50° C. to allow for a temperature curve, e.g. as shown in FIG. 8 according to the ISO 834-standard. Most critical is the first 5-10 minutes of the temperature curve as shown in FIG. 8, where the temperature time-derivative dT/dt is very high. Consequently, this critical time period determines the preheating temperature, at which the separation plate 20 is to be deactivated. As shown in FIG. 2b, the supporting construction 24 is made from the same material as the separation plate 20. In other examples, the supporting construction 24 may be made from a different material providing the sufficient mechanical strength, such as e.g. metal or refractory bricks.

Additionally, the material of the separation plate 20 should be able to withstand the repetitive rapid heating and cooling. As the activation and/or deactivation, i.e. insertion and/or removal of the separation plate 20, may be done manually, the weight of the separation plate 20 should furthermore be sufficiently low for one operator to perform the activation/deactivation without the need of machinery or the like, thus preferably less than 20 kg and more preferred less than 10 kg.

Figure 3:
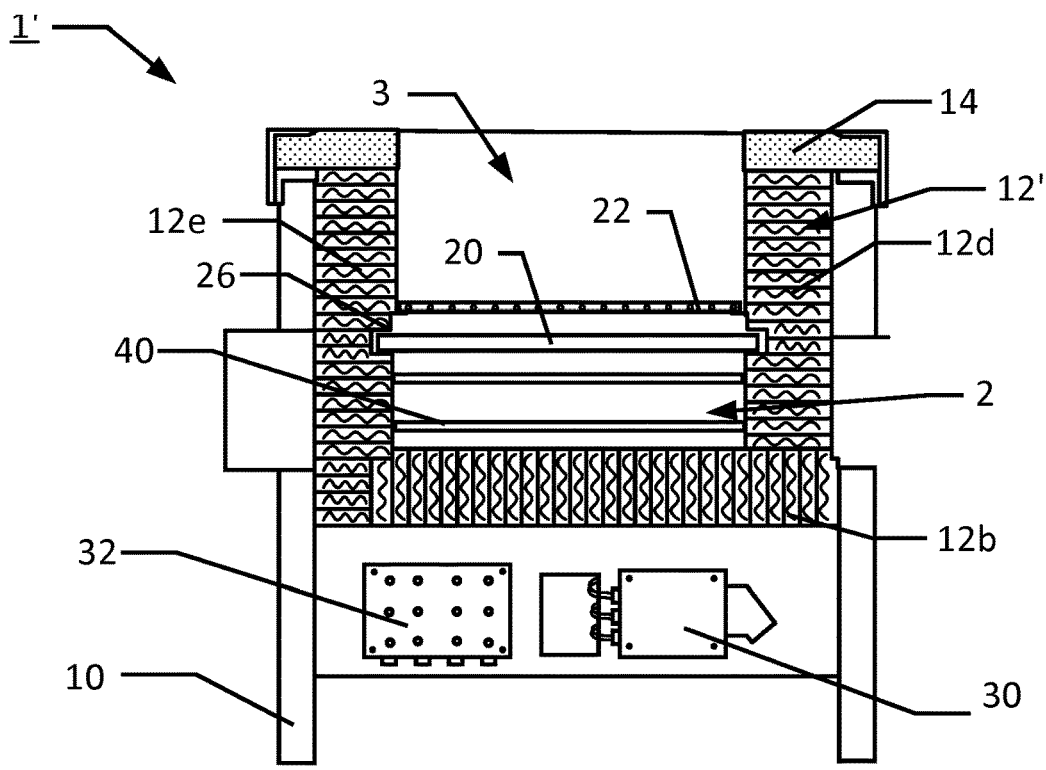

In FIG. 3, a detailed cross-section of another example of a fire testing device 1' according to the principles of the present disclosure is shown. Similar to the examples shown in FIGS. 1, 2a and 2b, the fire testing device 1' comprises a first chamber 2, a second chamber 3, an outer frame 10, an inner frame 12' consisting of frame parts 12b, 12d, 12e, a top frame 14, a separation plate 20 separating the first chamber 2 and the second chamber 3, a grid 22 and a plurality of heating elements 40 arranged in the first chamber 2.

As seen in FIG. 3, the separation plate 20 is arranged in a set of brackets 26 acting as rails holding the separation plate 20. The separation plate 20 can thus be activated and deactivated by sliding in and out, respectively of these brackets. In the example of the fire testing device 1' shown in FIG. 3, the brackets 26 are arranged in two inner frame parts 12d, 12e and may extend along the length of these inner frame parts. It is, however, to be understood that brackets 26 may be arranged in one or three or more of the inner frame parts 12a-12e to provide a secure hold for the separation plate 20 and a seamless positioning thereof. Moreover, the brackets 26 may extend only a portion of the length of the inner frame part 12a-12e, such that several brackets 26 may be arranged with a spacing relative to each other in each inner frame part 12a-12e. Alternatively, one bracket 26 extending a portion of the length of the inner frame part 12a-12e may be arranged in the inner frame parts 12a-12e. Furthermore, as seen in FIG. 3, the brackets 26 similarly support the grid 22. In another example, the brackets 26 may only act as rails holding the separation plate 20. The brackets 26 may, thus, be made from the same material as one or more of the inner frame parts 12a-12e, or from concrete, or metal, such as steel, or a similar material capable of withstanding the high temperatures inside the oven chambers 2, 3 whilst maintaining its shape.

In the exemplary example of the fire testing device 1' shown in FIG. 3, the grid 22 is arranged in the second chamber 3 and is thus closer to the test subject, which in use is to be arranged at the opening of the second chamber 3, than the separation plate 20. By such an arrangement of the grid 22 and the separation plate 20, the downfall will be caught by the grid 22 before reaching the separation plate 20 and/or the means holding the separation plate 20, i.e. the brackets 26. Thus, it may be avoided that downfall interferes with the brackets 26 and prevents or impedes the insertion of the separation plate 20.

Moreover, the fire testing device 1' as shown in FIG. 3, furthermore comprises means 32 for regulating the gas pressure and gas constituent concentration inside the chambers 2, 3. The pressure and oxygen level regulating means 32 may be connected to a separate container comprising pressurised air or other gas mixture. By means of a pipe system (not shown), i.e. at least one pipe arranged at an exterior side of one or more of the inner frame parts 12a-12e, connected to one or more pipes going through an inner frame part 12a-12e to connect to the first 2 and/or second chamber 3, oxygen and/or pressurised air and/or another gas mixture may be provided to the chambers 2, 3. For instance, steel pipes with an outer diameter of 9-15 mm may be used. Preferably, several pipes connect to the chambers 2, 3 to avoid turbulence and/or flow effects inside the chambers.

The fire testing device 1' may furthermore comprise a chimney (not shown) or similar exhaust means connected to at least one of the chambers 2, 3 to provide a natural and/or controlled ventilation thereof. The gas flow through the chimney may be controlled by a motor and/or valves, or may be controlled by a gas damper to allow for a controlled gas flow and/or pressure inside at least one of the chambers 2, 3. Since combustion of the test material takes place, exhaust gasses occur, which may be polluting and/or cause odour nuisance for the surroundings. Hence, means for cleaning the exhaust gas may furthermore be provided. These cleaning means may for instance comprise a carbon filter, a scrubber, and/or a waste gas cleaning arrangement, if the volume and temperature of the exhaust gas if sufficiently high. Such cleaning means may be arranged in combination with the chimney or separately.

The inflow of gas, i.e. oxygen and/or pressurised air, may be regulated by dampers, preferably an automated throttle valve controlled by a pressure transmitter (not shown), and/or valves, nozzles or the like. Thereby a small positive or negative pressure of e.g. 20 Pa inside at least one of the chambers 2, 3 may be maintained, thus allowing for fire resistance testing porous materials and/or testing in accordance with EN 1363-1 standard. Consequently, a Venturi system, which is to be considered well known for the skilled person, may be used to regulate the pressure and or gas composition inside the chambers 2, 3. The pressure and gas composition may be controlled for each chamber 2, 3 individually or for both chambers 2, 3 by the pressure and oxygen level regulating means 32. In an alternative example, the pressure inside the chambers 2, 3 may be regulated by means of a ventilator instead of or in combination with pressurised air and/or other gas mixtures.

Figure 9:
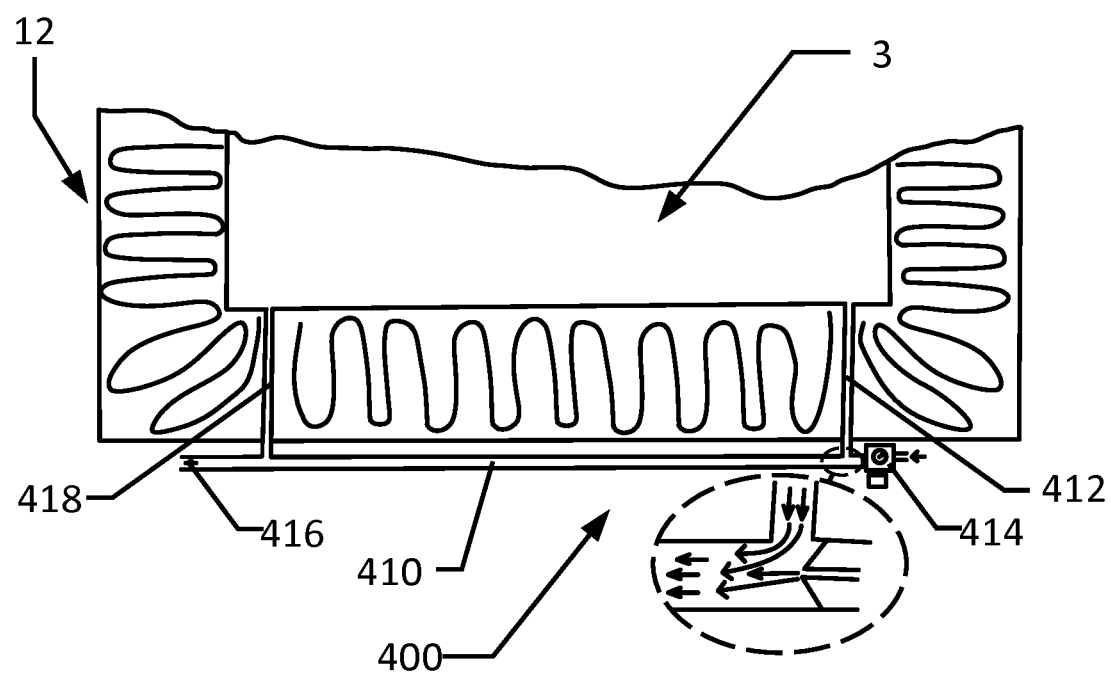
FIG. 9 shows a cross-section of a pressure regulating system of an embodiment of a fire testing device according to the invention.

In FIG. 9, a cross-section of a pressure regulating system 400 of an embodiment of a fire testing device according to the invention is shown. The system 400 shown in FIG. 9 is an example of a Venturi system and comprises a first pipe 410 arranged on an outer side of an inner frame 12 of the fire testing device. A second pipe 412 and a third pipe 418 traverse the inner frame 12 and are connected to the first pipe 410 and to a second chamber 3 of the fire testing device. The second pipe 412 and third pipe 418 each have a smaller diameter, preferably an outer diameter of around 9.53 mm, than the first pipe 410, preferably having an outer diameter of around 12.7 mm. In another embodiment, the second pipe 412 and third pipe 418 may have the substantially same diameter as the first pipe 410 or have a larger diameter. The second pipe 412 and third pipe 418 may have the substantially same or different diameters. The second pipe 412 and third pipe 418 may furthermore be connected to a first chamber (not shown in FIG. 9) of the fire testing device in combination with or instead of the second chamber 3. Moreover, the pressure regulating system 400 may comprise additional first, second and/or third pipes.

The pressure regulating system 400 furthermore comprises an in-flow valve arrangement 414 adapted for receiving compressed air and an outflow valve 416, allowing air to flow through the first pipe 410. The inflow valve arrangement 414 is connected to the first pipe 410 through a nozzle having an inner diameter, which is smaller than the inner diameter of the first pipe 410, and to the surroundings by means of a side valve, such that the inflow of compressed air into the first pipe may be regulated through the side valve. The compressed air flows through the nozzle of the inflow valve arrangement 414, and through the first pipe 410 past the connection of the first pipe 410 and the second pipe 412. Hence, an underpressure at the intersection of the first 410 and second pipe 412 is created, such that air is dragged out of the second chamber 3 through the second pipe 412, as indicated by the arrows in FIG. 9. The flow of air through the first pipe 410 is regulated by the outflow valve 416. Consequently, an overpressure is, in use, created at the connection of the first pipe 410 and the third pipe 418, creating an inflow of air through the third pipe 418 and into the second chamber 3. Thus, by regulating the flow of compressed air through the first pipe 410 by means of the inflow valve arrangement 414 and the outflow valve 416, the air flowing through the second pipe 412 and third pipe 418 to and from the second chamber 3 and thus the pressure inside the second chamber 3 can be controlled. The control of the inflow valve arrangement 414 and outflow valve 416 may be carried out manually or automatically by means of a control unit.

Figure 7:
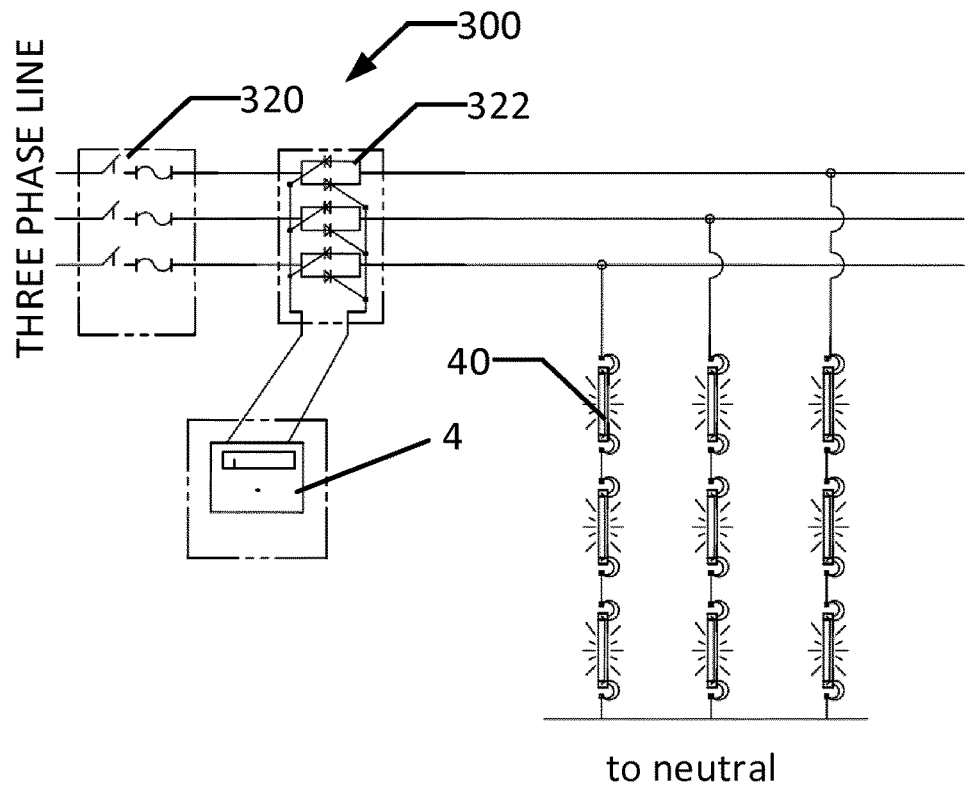
FIG. 7 shows a schematic of an example of an electrical circuit for supplying and controlling delivered power to the electrical heating rods of a fire testing device on a three-phase power line.

The fire testing device 1', as shown in FIG. 3, furthermore comprises a wiring box 30 comprising connection means to an alternating current (AC) source and an electrical, regulating circuit 300. An example of the regulating circuit 300 for a three phase electrical power source can be seen in FIG. 7. The regulating circuit comprises at least a fuse 320 and a thyristor 322, e.g. a silicon controlled rectifier (SCR), for each phase of the AC-line. The thyristor 322 is controlled by a control unit 4 to regulate the current delivered to the plurality of electrical heating elements 40, i.e. heating rods. In this example, three heating rods 40 are connected in series to each of the three phases.

The fuses 320 may be e.g. 10A, 16A, 32A fuses, such as thermal protection fuses, resettable fuses, circuit breakers, or the like, and may be similar or different for each phase. As the fire testing device 1' should be able to be operated in e.g. industrial environments without the need of special wiring, the regulating circuit 300 may comprise several connectors to an AC-source, to facilitate use of e.g. two separately fused 3-phase 16A outlets, which are more likely to be present than one 3-phase 32A outlet. Alternatively, the regulating circuit may be adapted to operate on 1 phase. In another example, the regulating circuit may comprise power MOSFETs, insulated-gate bipolar transistors (IGBT), switched capacitor-circuits, rectifier diodes, or any combination thereof instead of or in combination with the thyristors 322.

The control unit 4 may be integrated in the wiring box 30 or may be separate, such as a computer, mobile device, or the like, connected to the wiring box 30. Alternatively, a separate unit may be connected to and communicate with a control unit 4 integrated in the wiring box 30. By having a unit, such as a computer, a mobile device, or the like, which may be placed separately from the wiring box 30 and thus from the fire testing device 1', the operator may operate the fire testing device 1' to follow a predetermined temperature from a remote position. This may allow for a higher security level and comfort for the operator.

An operator may manually control the thyristors 322, and consequently the power delivered to the heating rods 40, by means of the control unit 4. The operator may, in order to do so, gain input from sensors (not shown) placed in the lid, on the test subject, and/or in the chambers 2, 3 of the fire testing device 1'. The sensors may e.g. be temperature sensors, thermographic cameras, pressure sensors, oxygen level sensors, or any combination thereof. Alternatively, the control unit 4 or a remote unit controlling the control unit 4 may apply known controlling and regulating techniques, such as proportional (P), proportional-derivative (PD), proportional-integral (PI), proportional-integral-derivative (PID) control loop feedback mechanisms, based on input from sensors. Thereby, the electrical, regulating circuit 300 may be operated automatically, semi-automatically, e.g. by an operator specifying a desired temperature and the controller regulating the supplied power to the heating elements 40 to reach the desired temperature.

In an alternative example, the control unit 4 and or an external unit connected to the control unit 4 may additionally control the means 32 for regulating the oxygen concentration and/or the pressure inside at least one of the chambers 2, 3. It will be apparent that control methods similar to the one described with relation to control of the thyristors 322 may be applied to control the pressure and/or oxygen level regulating means 32.

Figure 4:
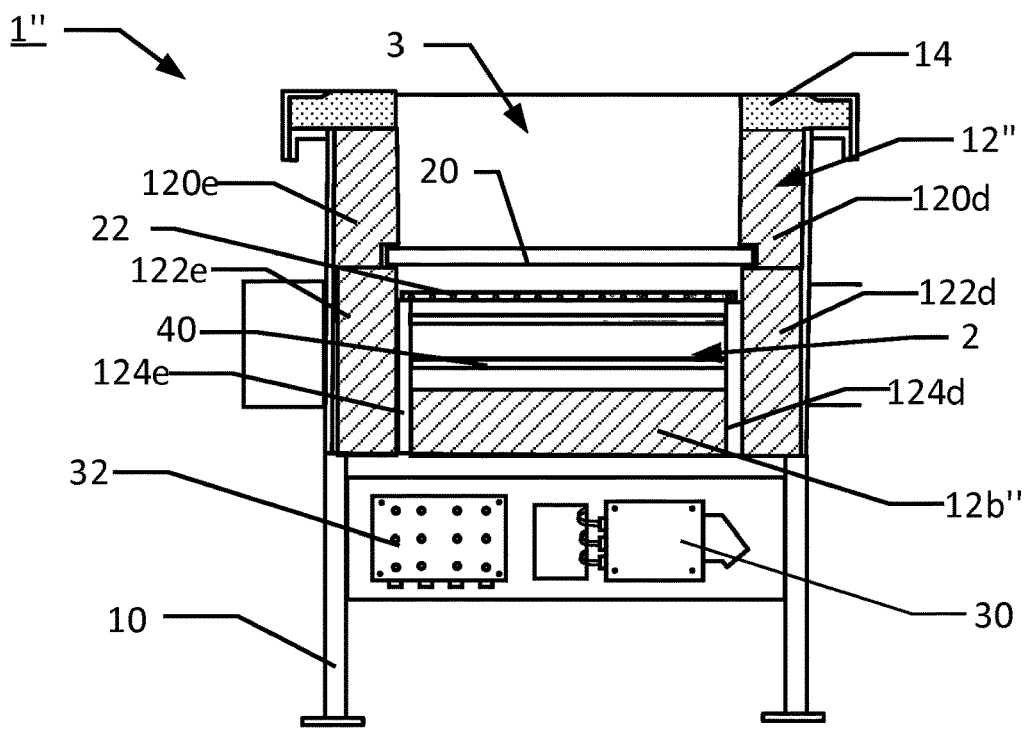
FIG. 4 shows a detailed cross-section of yet another example of a fire testing device according to the principles of the present disclosure.

In FIG. 4, a detailed cross-section of yet another example of a fire testing device 1" according to the principles of the present disclosure is shown. Similar to the fire testing device 1' shown in FIG. 3, the fire testing device 1" shown in FIG. 4 comprises a first 2 and a second chamber 3, an outer frame 10, a top frame 14, a separation plate 20, a grid 22, an electrical wiring box 30, pressure and oxygen level regulating means 32, and a plurality of heating rods 40. The fire testing device 1" also includes an inner frame 12" comprising a plurality of inner frame parts 12b", 120d, 120e, 122d, 122e, 124d, 124e, where 12b" is a bottom part. The inner frame parts 120d and 122d constitutes a first side part and 120e and 122e constitutes a second side part similar to the inner frame parts 12d and 12e, respectively, in the example of the fire testing device 1' shown in FIG. 3.

As seen in FIG. 4, the separation plate 20 is inserted in a groove in the frame parts 120d and 120e and thus, in an activated state, connects with the frame parts 120d, 122d, 120e and 122e. Consequently, the frame parts 122d and 122e encompass the first chamber 2, and the frame parts 120d and 120*e* encompass the second chamber 3. Thus, it is advantageous for the frame parts 122*d* and 122*e* may be made from a material with a large thermal mass, such that the first chamber 2 remains hot for a longer time, e.g. after a first fire resistance test. Consequently, the energy as well as time necessary to re-preheat the first chamber 2 for a second fire resistance test may be lowered, thereby allowing for more tests to be performed each day. Moreover, the frame parts 120*d* and 120*e* encompassing the second chamber 3 may be made from materials with low thermal mass, so that the second chamber 3 may be cooled down quickly after a fire resistance test. Preferably, the second chamber 3 should be able to be cooled down by natural or active ventilation, i.e. with no lid or test subject covering the opening thereof, within approximately 20 minutes. Alternatively, water cooling (not shown), such as integrated water cooling, may be provided to cool down the second chamber 3.

Thereby, the time in between two consecutive tests may be shortened, thus reducing the costs for a test and increasing the number of tests that may be carried out each day. In another example, the grooves for receiving the separation plate 20 may be provided in the frame parts 122*d*, 122*e*, such that the separation plate 20 is not in contact with the frame parts 120*d*, 120*e*. Alternatively, the grooves may be provided partly in the frame parts 120*d*, 120*e* and partly in the frame parts 122*d* and 122*e* to form one groove at a connection of 120*d* and 122*d* and 120*e* and 122*e*, respectively.

Moreover, as seen in FIG. 4, the frame parts 124*d* and 124*e* are arranged in the first chamber 2 in between the frame parts 12*b*''' and 122*d* and 122*e*, respectively, and support the grid 22. The frame parts 124*d* and 124*e* may thus be made from a material with a high thermal mass to maintain a high temperature in the first chamber 2 after the end of a test. In another example, the frame part 12*b*''' may extent to connect with the frame parts 122*d*, 122*e* and 124*d* and 124*e*.

Figure 5:
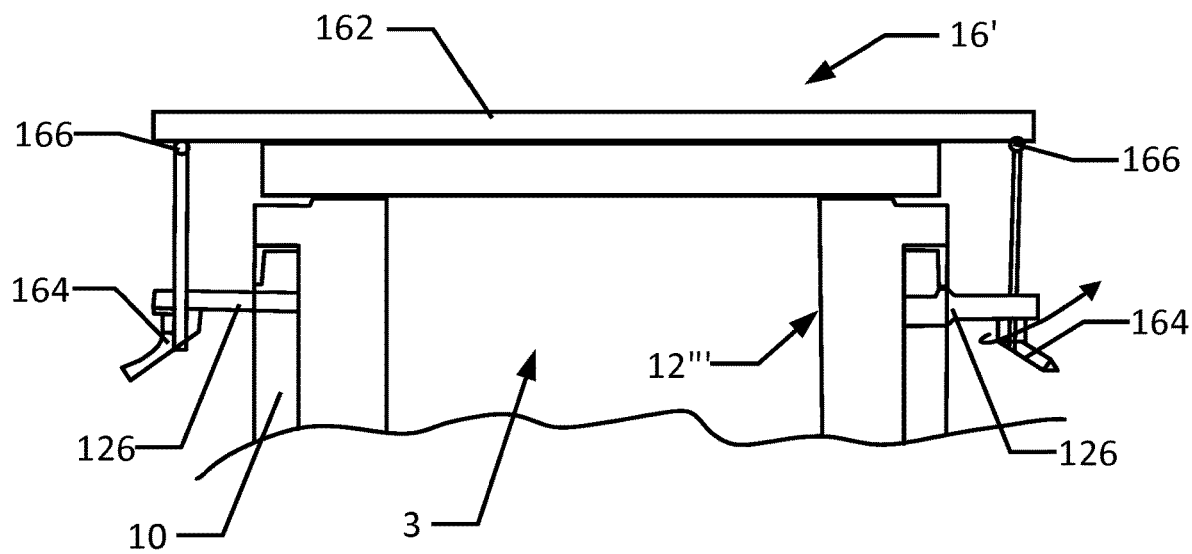
FIG. 5 shows a cross-section of an example of a lid for a fire testing device according to the principles of the present disclosure.

In FIG. 5, a cross-section of an example of a lid 16' of a fire testing device according to the principles of the present disclosure is shown. The lid 16' comprises a lid plate 162, one or more connecting means 166 for holding the lid in position by use of a number of holding means 164, adapted to engage a number of connection flanges 126. As seen in FIG. 5, a test subject is inserted between the lid plate 162 and the inner frame 12''', which comprises an integral top frame. The lid 16', thus, holds the test subject in contact with the opening of the second chamber 3. The connecting means 166 shown in FIG. 5 are rings, which are integral with the lid plate 162. The holding means 164 comprise a rod connected to a handle part and to the connecting means. By turning the handle part of the holding means 164 relative to a longitudinal direction of the rod, the rod is tightened in a quick release manner, i.e. when the handle part is parallel to the longitudinal direction of the rod, the holding means 164 are in a released state and does not pull the lid plate 162 in the direction of the second chamber 3. By tilting the rod in the direction indicated by the arrow, the holding means 164 may become free of the connection flanges 126, such that the lid 16', the holding means 164 and the connection means 166 can be removed. When the handle part is turned, e.g. up to 90 degrees, relative to the longitudinal axis of the rod, it exercises a force on the connection flanges 126 such that the holding means 164 pull the lid plate 162 towards the second chamber 3 to hold it in position.

The rod of the holding means 164 may furthermore comprise a thread, such that a nut or a handle or the like can be screwed onto the rod, and by tightening this, the holding means 164 exercises a force on the connection flanges 126, such that they pull the lid plate 162 towards the second chamber 3 to hold the test subject in position. Alternatively, the handle may comprise a thread in addition to the quick release.

The lid plate 162 may be a metal plate, such as an iron plate or a steel plate, which should be sufficiently thick to hold the test subject in position, yet easily removable. Consequently, a steel plate or a U-shaped profile with a thickness between 2 mm and 15 mm, and preferably around 5 mm, is preferred. Similarly, the holding means 164, and thus the bars and handles, may be made from metal, such as steel, brass, aluminium, or the like, or metal in combination with ceramics, plastic, or the like.

The connection flanges 126 are, as shown in FIG. 5, arranged on the outer frame 10 of the fire testing device and are made integral with and from the same material as the outer frame 10. In an alternative example, the connection flanges may be made from another material, e.g. another metal, and may be fixed to the outer frame 10, to the inner frame 12''', and/or to a top frame 14, if the top frame 14 is not integral with the inner frame 12''', by e.g. screws, welds, nails, pins, or any combination thereof.

Figure 6:
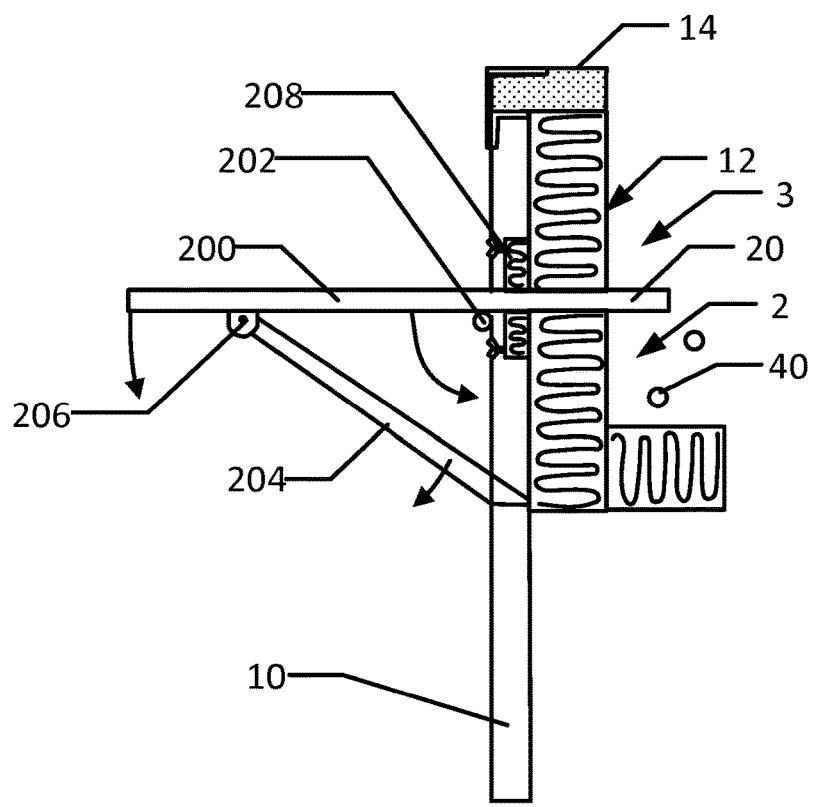
FIG. 6 shows a cross-section of an example of a deactivation system for the separation plate of a fire testing device according to the principles of the present disclosure.

In FIG. 6, a cross-section of an example of a deactivation system for the separation plate 20 of a fire testing device according to the principles of the present disclosure is shown. The deactivation system comprises two rails 200 (of which one is shown) for holding the separation plate 20 on an exterior side of the outer frame 10, a first set of hinges 202 connected to the outer frame 10 and to the rails 200, a support arrangement 204 comprising two bars of which one is shown and a cross member (not shown), and a second set of hinges 206 connected to the two rails 200. The two bars of the support arrangement 204 are furthermore removably connected to the outer frame 10, such that the support arrangement 204 in use may hold the rails 200, allowing the rails 200 receive and hold the separation plate 20 upon deactivation, i.e. by extraction thereof. In some examples, the rails 200 may be sufficiently long to hold the separation plate 20 on an exterior side of the outer frame 10 of the fire testing device. Hence, the operator will not need to hold the hot separation plate 20 to e.g. carry it away or put it down upon deactivation of the separation plate 20. The rails 200 as well as the individual members of the support arrangement may be made from metal, e.g. steel, to provide the mechanical strength and heat resistance necessary to receive and hold the separation plate 20.

The deactivation system furthermore comprises one or more heat insulating members 208, which may cover the opening in the inner frame 12, through which the separation plate 20 is removed, when the separation plate 20 is activated or deactivated. The heat insulating members 208 may be fixed around the opening in the inner frame 12 as shown in FIG. 5, while the separation plate 20 is being removed. After removal of the separation plate 20, the heat insulating members 208 may be fixed to the inner frame 12 to cover the opening in the inner frame 12. The fixation of the heat insulating members 208 may be carried out by e.g. screws, such as finger screws, or similar means, which preferably do not require tools to fix/remove. The heat insulating members may be made from and/or comprise an insulating material, such as e.g. PROMAFORM®-board or mineral wool in a bracket.

The support arrangement 204 may be disconnected from the outer frame 10 and by the second set of hinges 206 be rotated in the direction indicated by the arrow at the support arrangement 204 to extend in a direction parallel to a longitudinal direction of the rails 200. The rails 200 and the support arrangement 204 may then be rotated in the direction of indicated by the arrow at the first set of hinges 202 to lie flush with or at least extend substantially parallel to the longitudinal direction of the outer frame 10. Thereby, the fire-testing will take up less space when not in use or when in transport, and the more vulnerable parts, such as the hinges 202, 206 and the support arrangement 204 will be less exposed during transportation.

In another example, the deactivation system may comprise a sheet or plate, e.g. a steel plate, adapted to hold the separation plate, in combination with or instead of the rails 200. Furthermore, it is obvious to the skilled person that the sets of hinges 202, 206 may be replaced by e.g. two hinges or other pivoting means.

Although some examples have been described and shown in detail, the invention is not restricted to them, but may also be embodied in other ways within the scope of the subject matter defined in the following claims. In particular, it is to be understood that other examples may be utilised and structural as well as functional modifications may be made without departing from the scope of the present invention. It should furthermore be emphasised that the term "comprises"/"comprising" when used in this specification is taken to specify the presence of stated features, integers, steps, or components but not preclude the presence or addition of one or more features, integers, steps, components, or groups thereof.

What is claimed is:

1. A fire testing device for testing fire-resistance properties of a test subject, said fire testing device comprising:
    a cavity;
    a heat source adapted to heat said cavity; and
    a separation plate configured to subdivide the cavity into a first chamber and a second chamber;
    wherein said heat source is arranged in said first chamber and is adapted to preheat said first chamber;
    wherein said second chamber comprises an opening adapted to receive the test subject;
    wherein said separation plate is configured to be removable from said cavity; and
    wherein the fire testing device is configured to, at least during a testing of the fire-resistance properties of the test subject, reach a temperature of at least 600° C. in said cavity; and wherein the opening of the second chamber is adapted to receive a lid comprising said test subject so that said test subject covers the opening of the second chamber.

2. The fire testing device according to claim 1, wherein the separation plate is configured to be inserted into said cavity.

3. The fire testing device according to claim 1, wherein the heat source is an electrical heat source.

4. The fire testing device according to claim 3, further comprising a controller configured to control a power supply to said electrical heat source.

5. The fire testing device according to claim 1, further comprising a gas constituent concentration regulator inside the cavity.

6. The fire testing device according to claim 5, wherein the gas constituent concentration regulator inside the cavity is configured to regulate an oxygen (O2) concentration inside the cavity.

7. A fire testing device for testing fire-resistance properties of a test subject, said fire testing device comprising:
    a cavity;
    a heat source adapted to heat said cavity; and
    a separation plate configured to subdivide the cavity into a first chamber and a second chamber;
    wherein said heat source is arranged in said first chamber and is adapted to preheat said first chamber;
    wherein said second chamber comprises an opening adapted to receive the test subject,
    wherein said separation plate is configured to be removable from said cavity,
    wherein the fire testing device further comprises a gas pressure regulator inside said cavity; and wherein the gas pressure regulator comprises a valve arrangement configured to admit a pressurized gas into said cavity.

8. A method for testing fire-resistance properties of a test subject comprising:
    providing a fire testing device comprising a cavity and a heat source adapted to heat said cavity;
    subdividing said cavity into a first chamber and a second chamber by activating a removable separation plate;
    arranging the test subject at an opening of the second chamber;
    pre-heating said first chamber to a defined temperature using said heat source;
    deactivating said removable separation plate, thereby providing an undivided cavity; and
    sustaining a heat supply to said cavity using said heat source.

9. The method according to claim 8, wherein the heat supply to said cavity is sustained for a fixed duration.

10. The method according to claim 8, wherein subdividing the cavity by activating the removable separation plate comprises inserting the removable separation plate into the cavity, and wherein deactivating the removable separation plate comprises removing the separation plate from the cavity.

11. The method according to claim 8, further comprising: regulating a gas pressure inside the cavity.

12. The method according to claim 8, further comprising: regulating a gas constituent concentration inside the cavity.

13. The method according to claim 8, wherein the sustained heat supply is controlled, such that the temperature inside the cavity follows a defined temperature curve.

14. The method of claim 13, wherein the defined temperature curve is in accordance with International Organization for Standardization (ISO) standard 834.

* * * * *